G. BRAAM.
APPARATUS FOR ABSORBING A FIXED QUANTITY OF GAS BY A LIQUID.
APPLICATION FILED DEC. 1, 1917.
1,256,291. Patented Feb. 12, 1918.
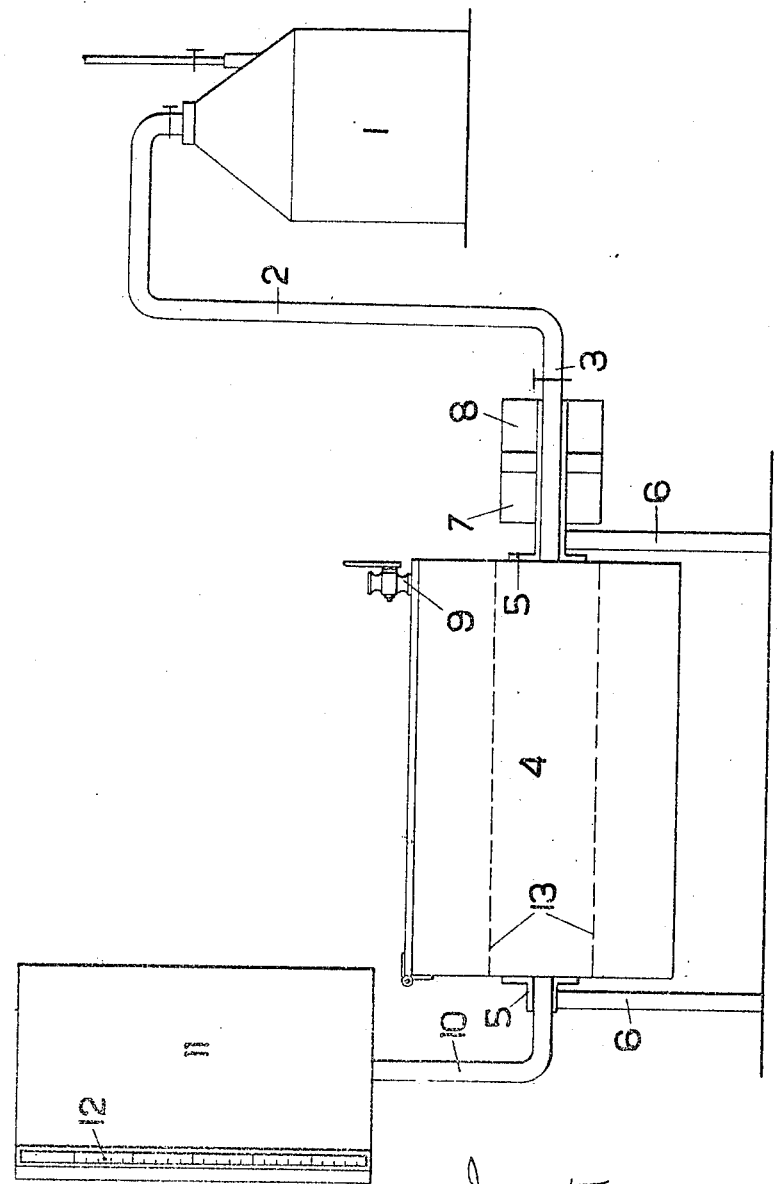

UNITED STATES PATENT OFFICE.

GEERT BRAAM, OF ROTTERDAM, NETHERLANDS.

APPARATUS FOR ABSORBING A FIXED QUANTITY OF GAS BY A LIQUID.

1,256,291. Specification of Letters Patent. Patented Feb. 12, 1918.

Application filed December 1, 1917. Serial No. 205,006.

*To all whom it may concern:*

Be it known that I, GEERT BRAAM, a subject of the Queen of The Netherlands, residing at 57 Julianalaan, Rotterdam, The Netherlands, have invented certain new and useful Improvements in Apparatus for Absorbing a Fixed Quantity of Gas by a Liquid, of which the following is a specification.

The invention relates to an apparatus for absorbing a fixed quantity of a gas by a liquid so that there is need for one absorption vat only without danger of loss of gas. Thus it is possible to obtain a fixed concentration of the gas in the liquid in the simplest possible way.

When leading a gas into a liquid with the intention of absorbing a fixed quantity of the gas one is obliged in the usual processes to employ a continuous control of the process in order to fix the time when the gas supply should be stopped. Moreover such gases as are not very readily absorbed (and these are exactly the gases, with which the best results are obtained by the present invention) present the difficulty that in order to avoid losses, several absorption vats must be connected in series to absorb the gas which has not been taken up by the liquid in the first vat. This means an important impediment to the control over the concentration.

The apparatus according to the invention unites simplicity with the possibility of regulating the concentration to a degree of accuracy which completely satisfies any practical requirements. The apparatus consists of two communicating vats of which one is the absorption vat and is filled at the beginning of the process with the absorbing liquid which can be agitated by rotating, shaking or the like, while the other vat, communicating with the first, serves in a way indicated hereinafter for the regulation of the quantity of gas absorbed.

For this purpose the regulation vat is provided with a scale by which it is possible to measure the volume of the liquid therein. This scale should be gaged experimentally, taking into consideration the particular gas to be absorbed.

By way of an example the drawing represents diagramatically, a vertical section of an apparatus according to the invention.

Therein 1 is a gas generator which is connected by the conduit 2 (consisting of course of a material which is not corroded by the gas) with the absorption drum 4, in which the liquid can be agitated, for instance by rotating, shaking or rocking the drum, or by stirring the liquid. In the drawing the absorption drum is provided with pivots 5, carried in bearings 6. The drum may be rotated by a loose and fixed pulley 7, 8 as indicated in the drawing, or by hand.

The mixing of the liquid with the gas is much promoted by baffle plates arranged perpendicularly to the end walls of the drum.

According to the drawing the gas is supplied centrally through the right hand pivot which forms a trunnion. Sometimes it is to be preferred to arrange the supply at some other point, for instance at that place of the drum, which is topmost when the drum is at rest. This presents the difficulty that the connection between the gas conduit and the drum has to be broken before the rotation of the drum begins. This drawback is, however, often more than counter-balanced by certain advantages and moreover does not apply to vats which are shaken or rocked. This point will be set forth hereinafter.

The absorption drum 4 can be filled with the absorbing liquid through the inlet opening 9 which can be closed watertight; the drum may be emptied through the same opening (*e. g.* if the drum can be rotated around its axis) or through any other opening provided for the purpose.

By the conduit 10 the drum is in communication with the regulation vat 11, which is provided with a scale on which the volume of the liquid in the vat may be read. This arrangement of the vat 11 is such that the liquid displaced from 4 rises in 11 and flows back at the ratio in which the gas is absorbed in 4.

The scale 12 is so graduated, that its readings show directly the volume (under normal pressure) of the unabsorbed gas present in the absorber 4, which unabsorbed gas forces a part of the liquid from 4 to 11. Hence in graduating the scale 12, it is necessary to take into account the pressure of the column of liquid in the vat 11 on the gas in 4.

The apparatus described above by way of an example works as follows:

After the drum 4 has been totally filled with the absorbing liquid the opening 9 is closed, while the connection between the absorption drum 4 and the regulation vat 11 remains open.

Now the valve in the gas supply pipe 3 is opened and the gas displaces a certain quantity of the liquid from the absorption drum 4 into the regulation vat 11 and there may be read off on the scale 12 what would be the volume of the gas in 4 under ordinary pressure.

As soon as the level of the liquid in 11 as indicated by the scale is such that the desired quantity of gas has been led into 4, the gas supply is cut off and the liquid in the absorption drum 4 is agitated, in the present instance by rotating the drum. The mixture is much promoted by periodically reversing the direction of rotation after every two or three revolutions which reversion may be practised by a simple alteration in the gear.

As the gas is absorbed by the liquid in the absorption drum 4 the level of the liquid in the regulation vat 11 sinks. When this vat is quite empty, all the gas led into 4 has been absorbed and the quantity of gas absorbed by the liquid is known with sufficient accuracy for all practical purposes.

The alteration in volume which the liquid undergoes by absorbing the gas may in most cases be neglected.

In case it is desirable to make the liquid absorb more than its own volume of the gas, the process described above is repeated till this object is attained.

It is self-evident that in leading the gas into the vat with the absorbing liquid part of the gas is at once dissolved. With gases, whose solubility is such that it would too much influence the accuracy of the result this drawback may be limited to a minimum by leading the gas not into, but above the liquid, by arranging the gas supply at that point of the vat which is at the top when the vat is at rest; this is one of those cases mentioned above in which the profits of a non-central supply of the gas surpass the drawbacks. Of course the pressure, under which the gas is supplied to the liquid, should be high enough to force a part of the liquid to the regulation vat which is located at a higher level than the absorption vat.

The apparatus described above is for instance very suitable for preparing chlorinated water of a fixed concentration. The ordinary solutions of chlorid of lime (bleaching powder), used in laundries, have several drawbacks, e. g. the presence of free lime or undissolved ingredients which injure the articles to be washed. Chlorid of lime (bleaching powder) has, however, the important advantage that a solution of a predetermined bleaching action may be easily obtained. With the apparatus according to the present invention chlorinated water of a predetermined concentration (and therefore with an action which may be accurately regulated) can be easily prepared, while the objectionable properties of solutions prepared from chlorid of lime are absent.

Having now described my invention, what I claim as new and desire to secure by Letters Patent, is:—

1. An apparatus for absorbing a fixed quantity of gas by a liquid, comprising the combination of an absorption vat, provided with means for leading thereinto the gas to be absorbed, and with means for agitating the liquid during the absorption of the gas, with a regulation vat in open communication with said absorption vat, which regulation vat is so arranged that the liquid, displaced from the absorption vat by the gas led thereinto, enters into the regulation vat and can be measured therein, while it flows back at a rate dependent upon the speed with which the gas in the absorption vat is absorbed.

2. An apparatus for absorbing a fixed quantity of gas by a liquid, comprising in combination, an absorption vat, which at that point which is on top when the vat is at rest, is provided with means for leading thereinto the gas to be absorbed and which is further provided with means for agitating the liquid during the absorption of the gas, and a regulation vat in open communication with said absorption vat, which regulation vat is so arranged that the liquid, forced from the absorption vat by the gas led thereinto, enters the regulation vat and can be measured therein, while it flows back at a speed dependent upon the speed of absorption of the gas in the absorption vat.

3. An apparatus for absorbing a fixed quantity of gas by a liquid, comprising an absorption vat, which at that point which is on top when the vat is at rest, is provided with means for leading thereinto the gas to be absorbed and which is further provided with means for agitating the liquid during the absorption of the gas, and a regulation vat in open communication with said absorption vat, which regulation vat is so arranged that the liquid forced from the absorption vat by the gas led thereinto, enters the regulation vat and can be measured therein by a scale indicating directly the volume which the gas in the absorption vat would have at ordinary pressure, the liquid flowing back into the absorption vat at a speed equal to the rate at which the gas in the absorption vat is absorbed.

In testimony whereof I affix my signature in presence of two witnesses.

GEERT BRAAM.

Witnesses:
PLANTE FÉBURE,
H. Y. KORY.